US011124202B1

(12) United States Patent
Stark et al.

(10) Patent No.: US 11,124,202 B1
(45) Date of Patent: Sep. 21, 2021

(54) ADJUSTING TIMING OF ACTUATION COMMANDS TO ACCOUNT FOR FIXED AND VARIABLE DELAYS IN AUTONOMOUS DRIVING CONTROL OF VEHICLES

(71) Applicant: Waymo LLC, Mountain View, CA (US)

(72) Inventors: Ethan Stark, Sunnyvale, CA (US); Daniel Trawick Egnor, Palo Alto, CA (US); Ryan Cash, Sunnyvale, CA (US)

(73) Assignee: Waymo LLC, Mountain View, CA (US)

(*) Notice: Subject to any disclaimer, the term of this patent is extended or adjusted under 35 U.S.C. 154(b) by 282 days.

(21) Appl. No.: 15/716,888

(22) Filed: Sep. 27, 2017

(51) Int. Cl.
| | |
|---|---|
| *B60W 50/06* | (2006.01) |
| *B60W 10/04* | (2006.01) |
| *B60W 10/18* | (2012.01) |
| *B60W 10/20* | (2006.01) |
| *B60W 30/10* | (2006.01) |
| *B60W 50/00* | (2006.01) |

(52) U.S. Cl.
CPC ............ *B60W 50/06* (2013.01); *B60W 10/04* (2013.01); *B60W 10/18* (2013.01); *B60W 10/20* (2013.01); *B60W 30/10* (2013.01); *B60W 50/0097* (2013.01); *B60W 2050/0062* (2013.01); *B60W 2552/15* (2020.02); *B60W 2710/09* (2013.01); *B60W 2710/18* (2013.01); *B60W 2710/20* (2013.01); *B60W 2720/106* (2013.01); *B60W 2720/24* (2013.01)

(58) Field of Classification Search
CPC ....... B60W 30/18163; B60W 2540/00; B60W 2540/30; B60W 2550/12; B60W 2550/146; B60W 2550/308; B62D 15/0255; G06K 9/00798; G06N 5/00; G05D 1/0088
See application file for complete search history.

(56) References Cited

U.S. PATENT DOCUMENTS

| | | | | |
|---|---|---|---|---|
| 5,810,692 | A | * | 9/1998 | Takiguchi ........... F16H 61/0437 477/144 |
| 5,913,748 | A | * | 6/1999 | Takiguchi ............. F16H 61/067 477/148 |
| 2013/0032421 | A1 | | 2/2013 | Bonne et al. |
| 2013/0211656 | A1 | | 8/2013 | An et al. |
| 2014/0088855 | A1 | | 3/2014 | Ferguson |
| | | | | (Continued) |

FOREIGN PATENT DOCUMENTS

DE     102012018122 A1     3/2013

*Primary Examiner* — Redhwan K Mawari
(74) *Attorney, Agent, or Firm* — Botos Churchill IP Law (57) ABSTRACT

Aspects of the disclosure relate to controlling a vehicle in an autonomous driving mode. For instance, a trajectory is identified. The trajectory defines a future desired path for the vehicle and includes a control requirement having a corresponding point in time. A command for achieving the control requirement is generated. A fixed delay value corresponding to a delay caused by transmission of the command to an actuator of the vehicle is generated. A variable delay value corresponding to a delay caused by an amount of time to change a physical state of the actuator to a desired state according to the command is generated. The command is then sent to the actuator based on the fixed delay value, the variable delay value, and so that the actuator causes the vehicle to move according to the command.

22 Claims, 8 Drawing Sheets

(56) References Cited

U.S. PATENT DOCUMENTS

2016/0090093 A1\* 3/2016 Neumann ....... B60W 30/18072
                                                                701/48
2018/0038952 A1\* 2/2018 Shokonji ............... G01S 13/867
2018/0058357 A1\* 3/2018 Magner .................. F02D 41/40
2018/0086351 A1\* 3/2018 Zhu ....................... B60W 30/16
2018/0186403 A1\* 7/2018 Zhu .................... B62D 15/0265
2019/0032774 A1\* 1/2019 Yoshikawa ........... B60W 10/06

\* cited by examiner

ADJUSTING TIMING OF ACTUATION COMMANDS TO ACCOUNT FOR FIXED AND VARIABLE DELAYS IN AUTONOMOUS DRIVING CONTROL OF VEHICLES

BACKGROUND

Some vehicles may operate in various modes which provide different levels of control to a driver. For instance, typical vehicles may operate in manual driving modes, where a driver controls acceleration, deceleration, and steering of the vehicle as well as semi-autonomous mode, such as cruise control, where computing devices of the vehicle controls acceleration and deceleration while a driver controls steering, etc. In some instances, these vehicles may also operate in autonomous driving modes where the computing devices of the vehicle controls all of braking, all of the acceleration, deceleration and steering of the vehicle without continuous input from a driver or passenger. In the autonomous mode, the passenger may provide some initial input, such as a destination location, and the vehicle maneuvers itself to that destination.

In order to navigate the vehicle in the autonomous driving mode, the vehicle's computing devices may use information from the vehicle's perception system in order to identify the location and other characteristics of objects in the vehicle's environment. This information may then be combined with other information, such as a pre-stored map of the vehicle's environment, in order to make predictions about how certain objects, such as other vehicles, pedestrians, bicyclists will behave. These predictions, along with a route to a destination location, are used to generate a plan to maneuver the vehicle to the destination location by controlling various actuators for acceleration, deceleration, and steering of the vehicle.

Many device controllers must attempt to control a system without knowledge of future commands. However, in the case of autonomous vehicles, or vehicles having an autonomous driving mode, as noted above, the vehicle's control system generates a plan or trajectory for maneuvering the vehicle for some period into the future. This trajectory is then converted to commands which are executed by the vehicle's various actuators, such as a brake pedal or input of a deceleration system, a motor or engine of the acceleration system, and tire orientation control (i.e. the steering shaft, pinion and rack in a rack and pinion system) of the steering system.

BRIEF SUMMARY

One aspect of the disclosure provides a method of controlling a vehicle in an autonomous driving mode. The method includes identifying, by one or more processors, a trajectory defining a future desired path for the vehicle, the trajectory includes a control requirement having a corresponding point in time; generating, by the one or more processors, a command in order to achieve the control requirement; identifying, by the one or more processors, a fixed delay value corresponding to a delay caused by transmission of the command to an actuator of the vehicle; determining, by the one or more processors, a variable delay value corresponding to a delay caused by an amount of time to change a physical state of the actuator to a desired state according to the command; and sending, by the one or more processors, the command based on the fixed delay value, the variable delay value, and the point in time so that the actuator causes the vehicle to move according to the control requirement at the point time.

In one example, the actuator is an actuator of an acceleration system of the vehicle. In this example, the control requirement includes increasing acceleration of the vehicle to reach a desired speed. In addition, the variable delay value corresponds to an amount of time for an engine or motor of the vehicle to reach the desired speed. In another example, the actuator is an actuator of a deceleration system of the vehicle. In addition, the control requirement includes increasing deceleration of the vehicle to reach a desired speed. In addition, the variable delay value corresponds to an amount of time for a brake of the vehicle to reach the desired deceleration level. In addition, the actuator is an actuator of a steering system of the vehicle. In addition, the control requirement includes changing an orientation of a tire of the vehicle to a desired orientation. In addition, the variable delay value corresponds to an amount of time for the tire of the vehicle to reach the desired orientation. In another example, the method also includes determining an environmental delay value based on a grade of a road surface for an estimated location of the vehicle, and sending the command is further based on the environmental delay value.

Another aspect of the disclosure provides a system for controlling a vehicle in an autonomous driving mode. The system includes one or more processors configured to identify a trajectory defining a future desired path for the vehicle, the trajectory includes a control requirement having a corresponding a point time; generate a command in order to achieve the control requirement; identify a fixed delay value corresponding to a delay caused by transmission of the command to an actuator of the vehicle; determine a variable delay value corresponding to a delay caused by an amount of time to change a physical state of the actuator to a desired state according to the command; and send the command based on the fixed delay value, the variable delay value, and the point in time so that the actuator causes the vehicle to move according to the control requirement at the point in time.

In one example, the actuator is an actuator of an acceleration system of the vehicle and the control requirement includes increasing acceleration of the vehicle to reach a desired speed. In another example, the variable delay value corresponds to an amount of time for an engine or motor of the vehicle to reach a desired speed. In another example, the actuator is an actuator of a deceleration system of the vehicle and the control requirement includes increasing deceleration of the vehicle to reach a desired speed. In addition, the variable delay value corresponds to an amount of time for a brake of the vehicle to reach the desired speed. In another example, the actuator is an actuator of a steering system of the vehicle and the control requirement includes changing an orientation of a tire of the vehicle to a desired orientation. In addition, the variable delay value corresponds to an amount of time for the tire of the vehicle to reach the desired orientation. In another example, the one or more processors are further configured to: determine an environmental delay value based on a grade of a road surface for an estimated location of the vehicle at the execution time, and sending the command is further based on the environmental delay value. In another example, the system also includes the vehicle.

DETAILED DESCRIPTION

Overview

As noted above, in autonomous vehicles, the vehicle's computing devices may generate a plan or trajectory for maneuvering the vehicle for some period into the future. This trajectory is then converted to commands which are sent to various actuators, such as a brake pedal or input of a deceleration system, a motor or engine of the acceleration system, and tire orientation control (i.e. the steering shaft, pinion and rack in a rack and pinion system) of the steering system for execution. In this regard, the commands are executed by the actuators as they are received. In many cases, however, there are delays which can cause certain commands to be executed at the actuators somewhat after the time intended by the trajectory. For instance, there may be delays caused by the time it takes commands to be transmitted to the actuators as well as delays caused by the time it takes for the actuators to act on the commands or delays caused by the physical characteristics of the system such as mechanical backlash in gears, or time to move components such as brake pads.

Because of this, the vehicle's systems may begin to accumulate errors. As an example, if the computing devices are attempting to speed the vehicle up, there may be a delay in the time it takes acceleration command to reach the acceleration actuator. Then, this command may be further delayed in execution because the engine or motor was not currently increasing power. In other words, it may take the engine or motor some period of time to "ramp up" to the commanded acceleration. Because of this, the actual acceleration experienced by and monitored at the vehicle may be slower or delayed as compared to what would be expected based upon when the acceleration commands were sent. As such, this may result in acceleration errors for which the planner system has to continuously adjust. Similar issues may be observed with acceleration, deceleration, or steering systems.

To address these issues, the computing devices of the vehicle which generate and send the commands for execution may adjust the timing or magnitude that the commands are sent based on the expected types of delays. For example, each acceleration, deceleration or steering command may be sent at least some fixed period of time earlier than needed for the trajectory in order to adjust for delays caused by the transmission of commands to each of the acceleration actuator, deceleration actuator, or steering actuator.

To determine these fixed delay values, monitoring devices may be used to monitor the times that commands are sent by the computing devices and received by each the actuators. The differences are the fixed delay values for each actuator. These fixed delay values may be stored in a table or other storage system and retrieved by the computing devices as needed. In addition or alternatively, the computing devices may also adjust the timing of commands based on variable delay values. For instance, these variable delay values may relate to the current physical states of the acceleration system, deceleration system or steering system. The fixed delay values and variable delay values may be summed in order to identify a total estimated delay time. The total estimated delay time may be used by the computing devices to determine when to send commands such that the commands are executed by the vehicle's various actuators.

In addition to the aforementioned adjustments for fixed and variable delays in the vehicle, the computing devices may also adjust the timing, and in some cases the amount of deceleration, acceleration, or steering changes of the commands for expected environmental delays in the vehicle reaching desired acceleration or deceleration based on the vehicle's environment.

Again because the computing devices generate the trajectory some time before the acceleration, deceleration and steering commands need to be sent to the actuators, the computing devices may be able to continuously adjust for both the fixed and variable delay values. By adjusting for both fixed and variable delays in an autonomous vehicle or a vehicle operating in an autonomous driving mode, the computing devices may be able to more "perfectly" and accurately control the vehicle. In other words, the quality of the computing devices control over the vehicle can be increased greatly thereby increasing safety and efficiency of the vehicle as well as safety and comfort to passengers of the vehicle. In addition, adjusting for these delays may reduce the amount of errors accumulated by the vehicle and additional proceeding needed at the planner to continuously correct for these errors.

Example Systems

Figure 1:
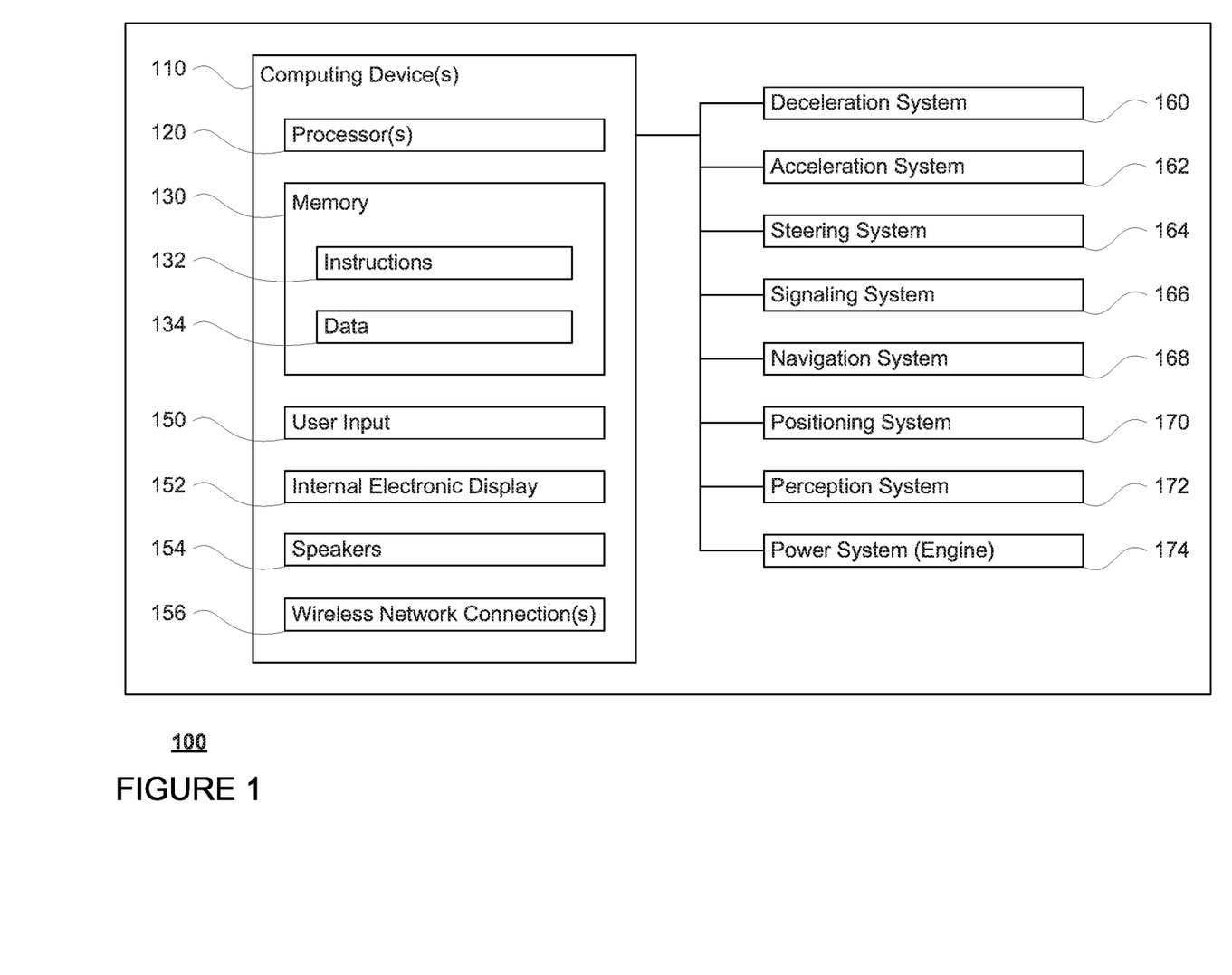
FIG. 1 is a functional diagram of an example vehicle in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
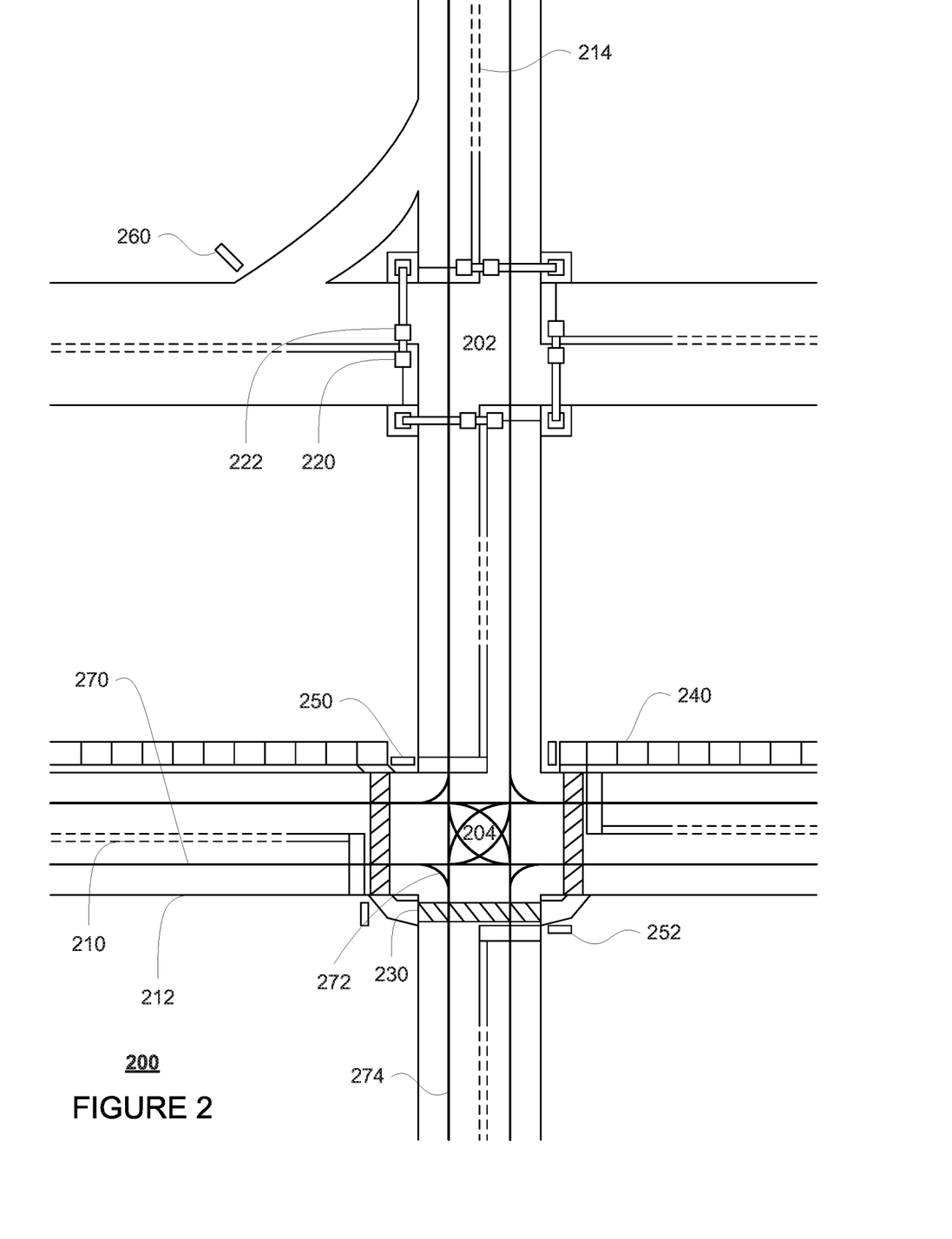
FIG. 2 is an example of map information in accordance with aspects of the disclosure.

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
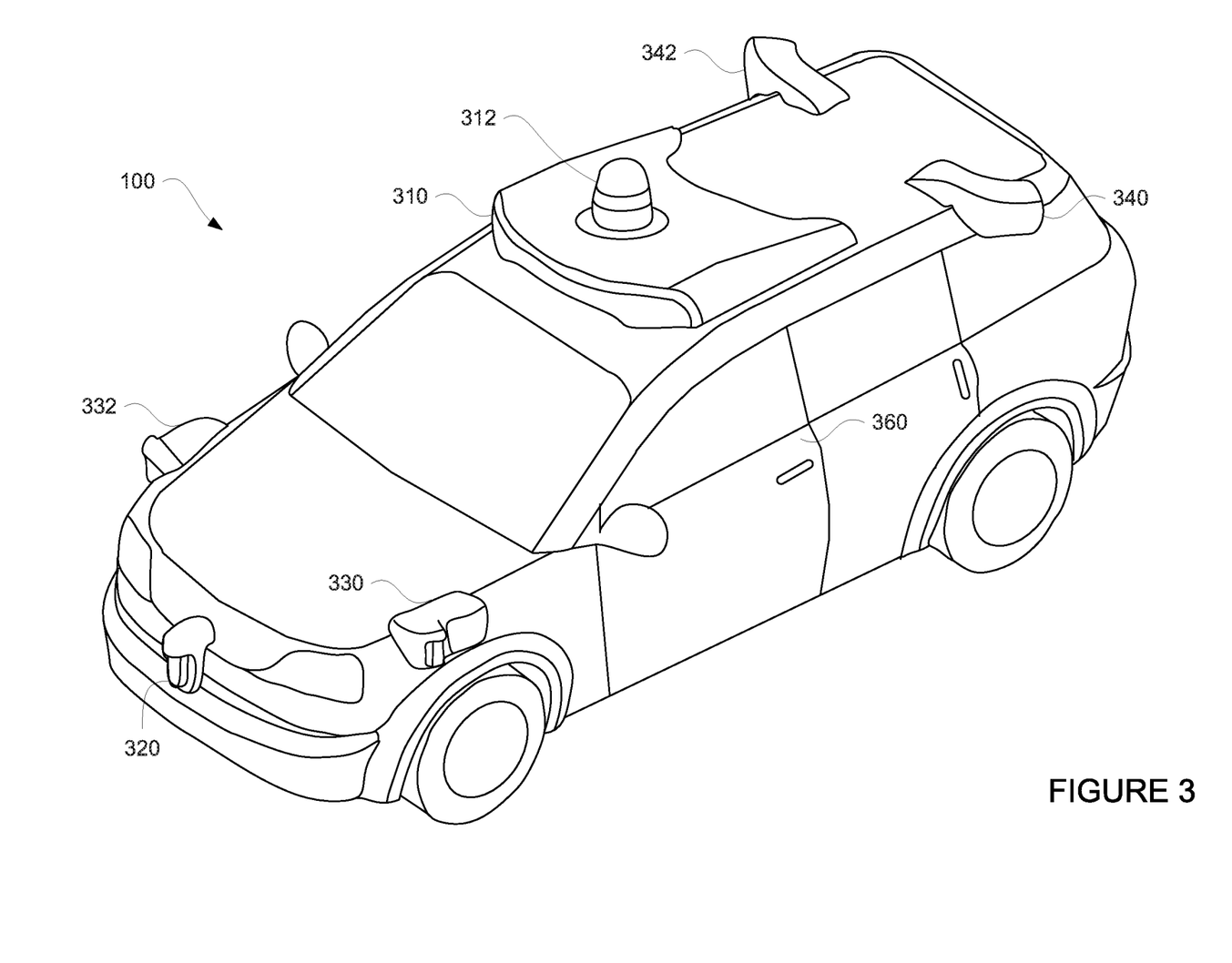
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a lidar sensor as well as various cameras and radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100.

The computing devices 110 may control the direction and speed of the vehicle by controlling various components. By way of example, computing devices 110 may navigate the vehicle to a destination location completely autonomously using data from the detailed map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
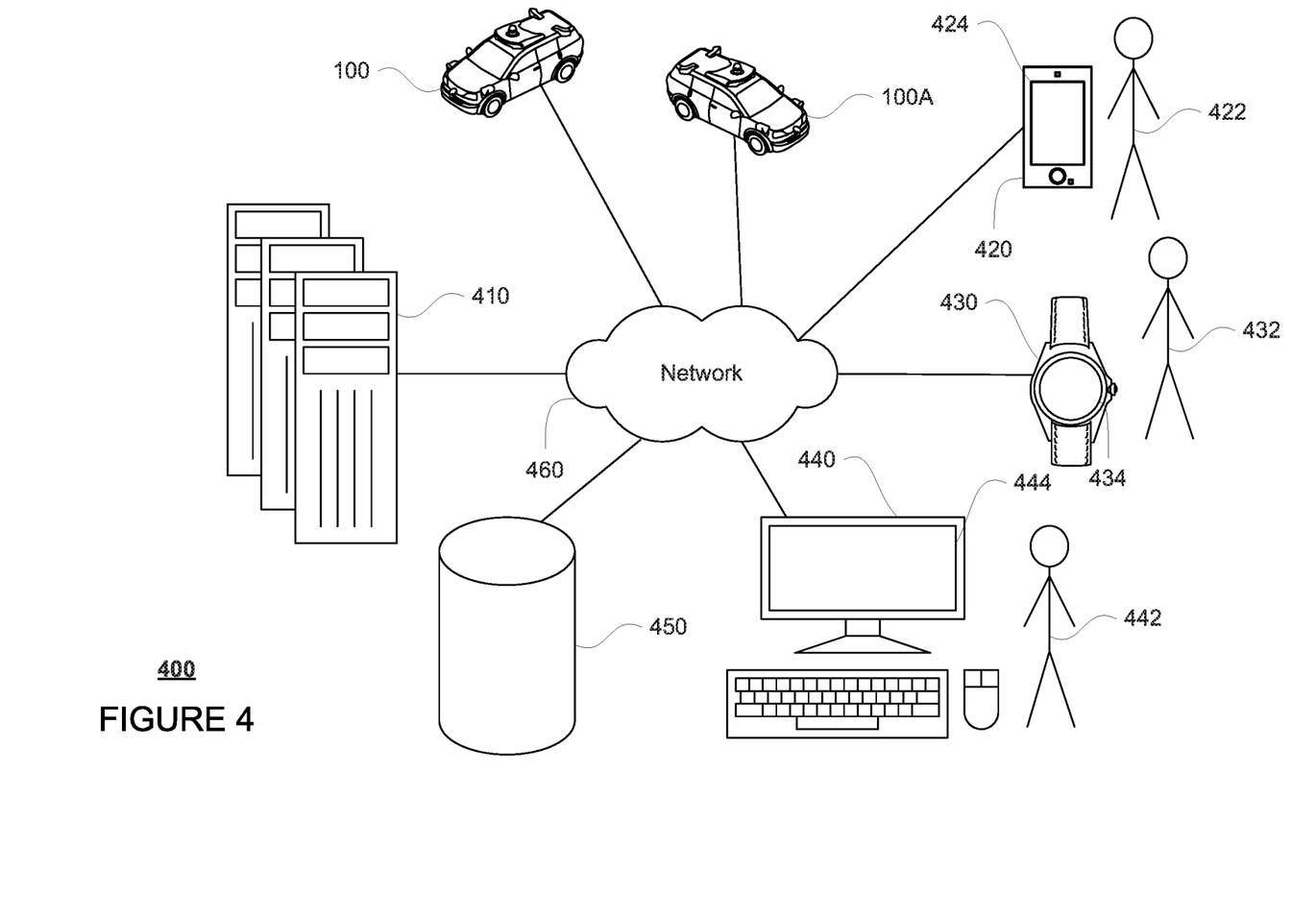
FIG. 4 is a pictorial diagram of an example system in accordance with an exemplary embodiment.
Figure 5:
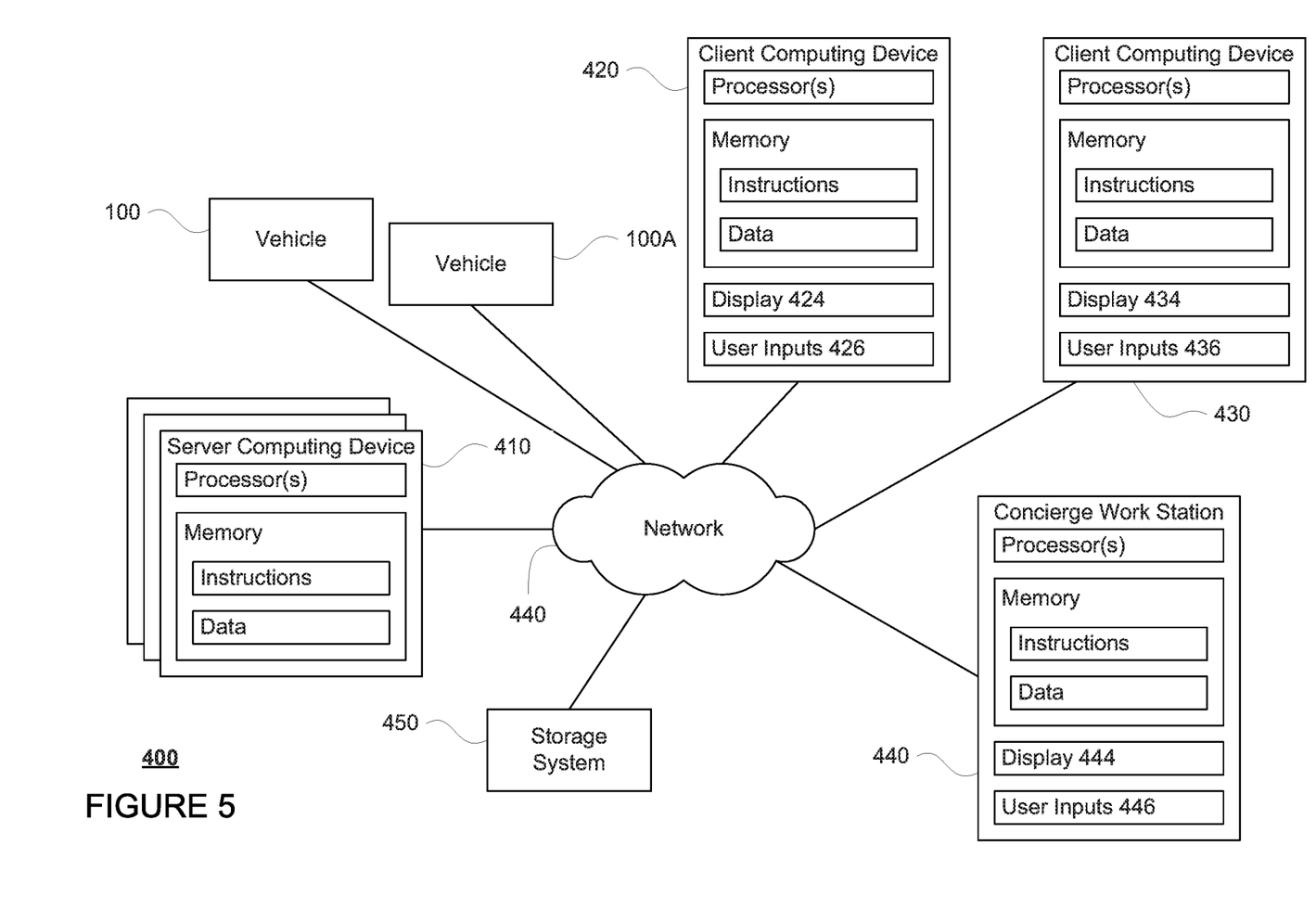
FIG. 5 is a functional diagram of the system of FIG. 4 in accordance with aspects of the disclosure.

Computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing devices 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing devices 110 of vehicle 100 or a similar computing device of vehicle 100A as well as computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a head-mounted computing system in FIG. 4. As an example the user may input information using a small keyboard, a keypad, microphone, using visual signals with a camera, or a touch screen.

In some examples, client computing device 440 may be a concierge work station used by an administrator to provide concierge services to users such as users 422 and 432. For example, a user 442 may be a concierge who uses the concierge work station 440 to communicate via a telephone call or audio connection with users through their respective client computing devices or vehicles 100 or 100A in order to facilitate the safe operation of vehicles 100 and 100A and the safety of the users as described in further detail below. Although only a single concierge work station 440 is shown in FIGS. 4 and 3, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Memory 130 may store various information including fixed delay values. These fixed delay values may correspond to delays caused by transmission of an actuation command (or simply a command) to an actuator of the vehicle. To determine a fixed delay value, monitoring devices may be used to monitor the times that commands are sent by the computing devices and received by each the actuators of the deceleration system 160, acceleration system 162, and steering system 164. The differences between the send and receive times for a given actuator are the fixed delay values for those actuators. These fixed delay values may be stored in a table or other storage configuration and retrieved by the computing devices 110 as needed.

Memory 130 may also store state functions for each of the deceleration system 160, acceleration system 162, and steering system 164. In one example, the state function for a given system, the input may include a desired amount of change in the state of the system or a profile of the desired change and the output may include a time to achieve the desired amount of change or general predictions about how the system will behave. Alternatively, the input to a state function for a given system may include a desired state of the system and a current state of the system, and the output may include a time to reach the desired state from the current state. In either case, using the example of the wheel (i.e. tire) of the vehicle, the greater the increase in the change of the angle of the wheel relative to the vehicle, the greater the amount of time required to accomplish the change. As such, a change of 5 degrees would take less time than a change of 10 degrees. Similarly, the greater the change in the acceleration or deceleration, the greater the time to accomplish the change. These functions may be empirically derived for the particular vehicle by testing the vehicle or testing vehicles with the same or similar configurations.

In addition to the operations described above and illustrated in the figures, various operations will now be described. It should be understood that the following operations do not have to be performed in the precise order described below. Rather, various steps can be handled in a different order or simultaneously, and steps may also be added or omitted.

As the vehicle moves through its environment, the perception system 172 may send the computing devices 110 sensor data identifying objects in the vehicle's environment as well as their characteristics. This information may be combined with feedback information from the vehicle's various systems as well as the map information in order to determine how to maneuver the vehicle through its environment. As part of this, the computing devices 110 may generate a trajectory for the vehicle to follow through its environment for some period into the future. This trajectory may include control requirements for the position and speed of the vehicle at different times during the period. For example, a trajectory may include a geometry component and a speed component. The geometry component may define one or more future positions of the vehicle at different times during the period while the speed component may define one or more future speeds of the vehicle at different times during the period.

Figure 6:
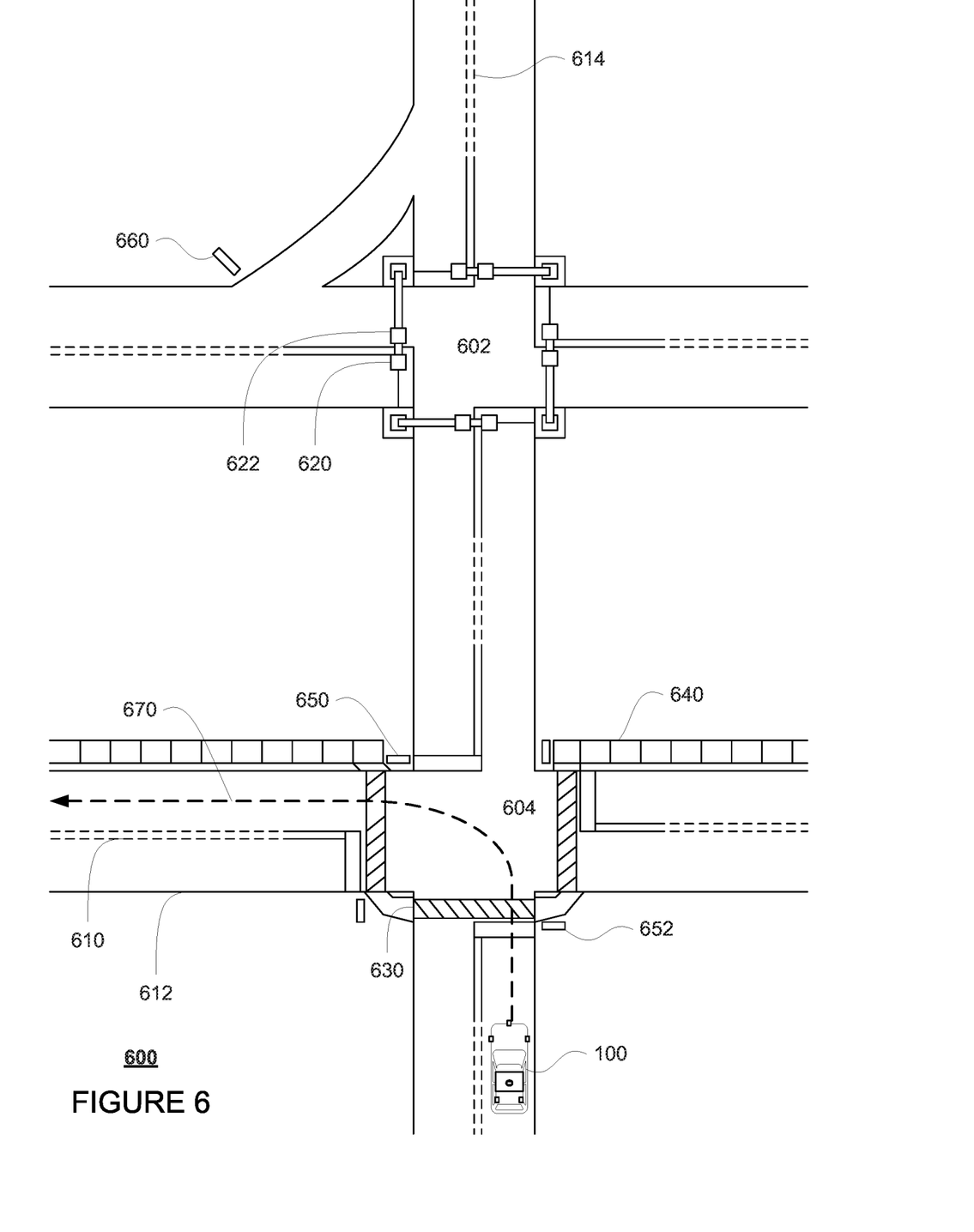
FIG. 6 is an example bird's eye view of a geographic area in accordance with aspects of the disclosure.

For instance, FIG. 6 depicts vehicle 100 being maneuvered on a section of roadway 600 including intersections 602 and 604. In this example, intersections 602 and 604 correspond to intersections 202 and 204 of the map information 200, respectively. In this example, lane lines 610, 612, and 614 correspond to the shape, location, and other characteristics of lane lines 210, 212, and 214, respectively. Similarly, crosswalk 630 corresponds to the shape, location, and other characteristics of crosswalk 230, respectively; sidewalks 640 correspond to sidewalks 240; traffic signal lights 620, 622 correspond to traffic signal lights 220, 222, respectively; stop signs 650, 652 correspond to stop signs 250, 252, respectively; and yield sign 660 corresponds to yield sign 260. In this example, the computing devices 110 have used map information 200 to determine a trajectory 670 for vehicle 100 to follow in order to reach a destination (not shown). In this example, trajectory 670 includes a speed component and geometry component (same as what is shown in FIG. 6 for trajectory 670) that will require that vehicle 100 may a left turn at intersection 604.

Figure 7:
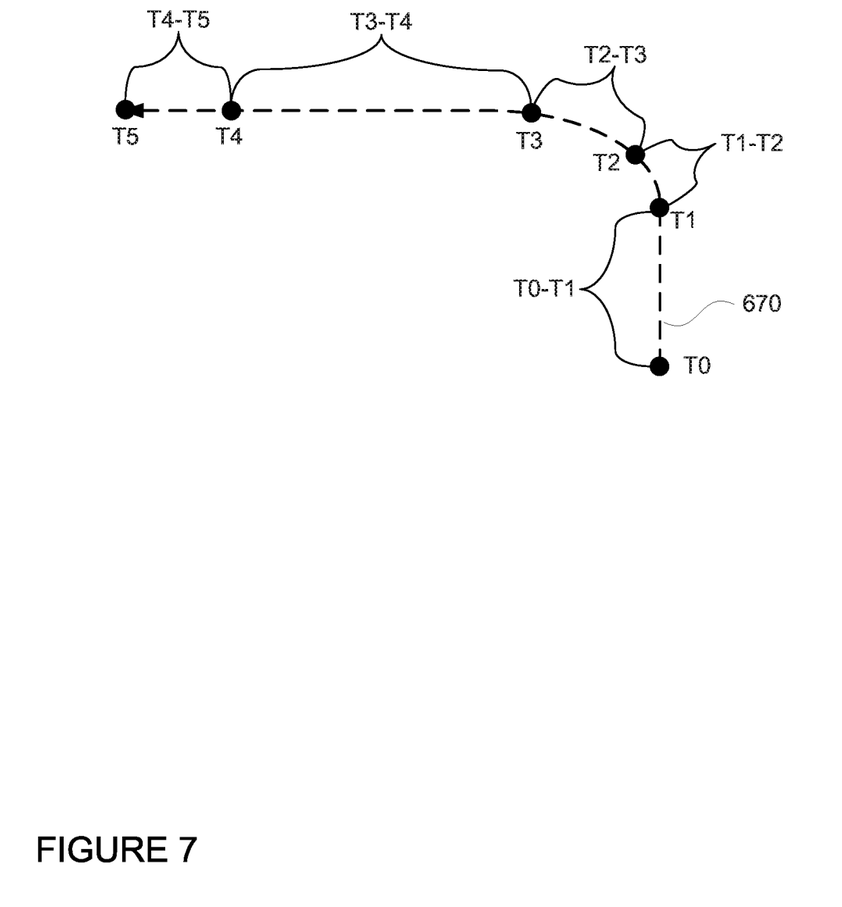
FIG. 7 is example data in accordance with aspects of the disclosure.

Turning to FIG. 7, the trajectory 670 may require that the vehicle take certain actions over at different points or periods in time over the period of the trajectory, here from T0 to T5. For instance, from T0 to T1, vehicle 100 must continue with its wheels at 0 degrees (i.e. straight) and reduce the speed from 25 to 10 miles per hour. From T1 to T2, vehicle 100 must change the orientation of its tires to 15 degrees initiate the left hand turn and increase the vehicle's speed to 15 miles per hour. From T2 to T3, vehicle 100 must bring the orientation of the tires back from 15 degrees to 0 degrees and increase the vehicle's speed to 25 miles per hour. From T4 to T5, the wheels must be at 0 degrees and the vehicle's speed must remain constant. As an alternative, rather than reaching certain goals between periods of time, the trajectory may require simply that at T0, the vehicle should be going 15 miles per hour, at T1, the vehicle should be going 10 miles per hour and the wheels should be oriented at 15 degrees, at T2 the vehicle should be going 10 miles per hour and the wheels should be oriented at 15 degrees, at T3 the vehicle should be going 15 miles per hour and the wheels at 0 degrees, and at T4 the vehicle should be going 25 miles per hour and the wheels at 0 degrees.

The computing devices 110 may then use the control requirements of the trajectory, for instance, geometry component and the speed component to generate commands for the actuators of the deceleration system 160, acceleration system 162, and/or steering system 164. For example, the geometry component may be used to determine one or more commands for how one or more actuators of the steering system should control the orientation of the vehicle's wheels (e.g. tires) in order to cause the vehicle to follow the geometry component of the trajectory. The speed component may be used to determine one or more commands for how one or more actuators of the deceleration system 160 and/or acceleration system 162 should control the respective systems in order to cause the vehicle to follow the speed component of the trajectory. In this regard, each command may identify an actuator of one of the deceleration system 160, acceleration system 162, or steering system 164 of the vehicle 100 as well as an amount of change or absolute value for that actuator or amount of change or absolute value for the system of the actuator.

For instance, returning to the examples above, for T0 to T1, a first command may require that the deceleration system use the vehicle's brake pedal to reduce the vehicle's speed from 25 to 10 miles per hour and a second command may require that the steering system use the steering actuator to maintain the orientation of the tires at 0 degrees. For T1 to T2, a third command may require that the acceleration system 162 use the accelerator to increase the speed of the vehicle to 15 miles per hour and a fourth command may require that the steering system 164 use the steering actuator to change the orientation of the tires to 15 degrees to the left. For T2 to T3, a fifth command may require that the acceleration system 162 use the accelerator pedal to increase the vehicle's speed to 25 miles per hour, and a sixth command may require that the steering system 164 use the steering actuator to bring the orientation of the tires from 15 degrees to the left back to 0 degrees. From T4 to T5, a seventh command may require that the acceleration system 162 use the accelerator to maintain the vehicle's speed at 25 miles per hour and an eighth command may require that the steering system use the steering actuator to maintain the orientation of the tires at 0 degrees.

For each command, computing devices 110 may determine a fixed delay value. As noted above, memory 130 may store fixed delay values for each of the actuators of the deceleration system 160, acceleration system 162, and steering system 164. In this regard, for a given the computing devices 110 may determine to which actuator the given command will be sent and use the table or other storage configuration to identify a corresponding fixed delay value for that actuator.

For instance, the fixed delay value for the first command may correspond to the time for messages from the computing devices 110 to reach the brake pedal, or F1. The fixed delay value for the second command may correspond to the time for messages from the computing devices 110 to reach the steering actuator, or F2. The fixed delay value for the third command may correspond to the time for messages from the computing devices 110 to reach the accelerator, or F3. The fixed delay value for the fourth command may correspond to the time for messages from the computing devices 110 to reach the steering actuator, or F4. The fixed delay value for the fifth command may correspond to the time for messages from the computing devices 110 to reach the accelerator, or F5. The fixed delay value for the sixth command may correspond to the time for messages from the computing devices 110 to reach the steering actuator, or F6. The fixed delay value for the seventh command may correspond to the time for messages from the computing devices 110 to reach the accelerator, or F7. The fixed delay value for the eighth command may correspond to the time for messages from the computing devices 110 to reach the steering actuator, or F8.

In addition or alternatively, the computing devices 110 may determine variable delay value. A variable delay value may correspond to a delay caused by an amount of time to change a current (or expected) physical state of the actuator to a desired state according to the command. In other words, these variable delay values may relate to the current physical states of the acceleration system, deceleration system or steering system. As an example, each time the computing devices must send a deceleration command to an actuator of the deceleration system 160, the computing devices may estimate a time it will take the deceleration system to reach the required level of deceleration for the deceleration command from a current or expected state of the deceleration system as close as possible the time that the actuator of the deceleration system 160 will receive the deceleration command.

In this regard, a variable delay value may be determined for different commands and system states using the state functions of memory 130. For instance, the amount of change identified by a given command may be input into the state function for the vehicle system of the actuator identified by the given command. The state function may then output a variable delay value for the given command.

For instance, the variable delay value for the first command may correspond to the amount of time required to reduce the vehicle's speed 15 miles per hour or from 25 to 10 miles per hour, or V1. The second command need not have a variable delay value, since the second command involves maintaining the orientation of the tires or rather, the variable delay value may be zero. The variable delay value for the third command may correspond to the amount of time required to increase the vehicle's speed 5 miles per hour or from 10 to 15 miles per hour, or V3. The variable delay value may correspond to the amount of time required to change the orientation of the tires 15 degrees or from 0 to 15 degrees to the left, or V4. The variable delay value for the fifth command may correspond to the amount of time required to increase the vehicle's speed 10 miles per hour or from 15 to 25 miles per hour, or V5. The variable delay value for the sixth command may correspond to the amount of time required to change the orientation of the tires 15 degrees or from 15 degrees to the left to 0 degrees, or V6. The seventh and eighth commands need not have a variable delay value, since the second command involves maintaining the speed of the vehicle and orientation of the tires or rather, the variable delay values may be zero.

The computing devices 110 may then send each given command to the actuator identified in the given command. The given command may be sent at a particular time based on the fixed delay value, the variable delay value, and the point or period of time for the given command. For instance, the given command may be sent at least an amount of time equal to the fixed delay value plus the variable delay value before the beginning of the point or period of time. In the examples above, the first command may be sent a time that F1+V1 before T0, the second command may be sent a time that F2+0 before T0, the third command may be sent a time that F3+V3 before T1, the fourth command may be sent a time that F4+V4 before T1, the fifth command may be sent a time that F5+V5 before T2, the sixth command may be sent a time that F6+V6 before T3, the seventh command may be sent a time that F7+0 before T4, and the eighth command may be sent a time that F8+0 before T4.

It will then take an amount of time equal to or approximately equal to the fixed delay value for given command to reach the actuator. In this regard, the given command will reach the actuator identified in the command at least an amount of time corresponding to the variable delay value before the beginning of the point or period of time. It will then take an amount of time equal to or approximately equal to the variable delay value for the actuator to cause the system to accomplish the change identified in the given command Because commands are acted upon as soon as the command reaches the identified actuator, the actuator causes the vehicle to change the deceleration, acceleration, or steering of the vehicle at and/or during the point or period of time according to the control requirement the trajectory.

Figure 8:
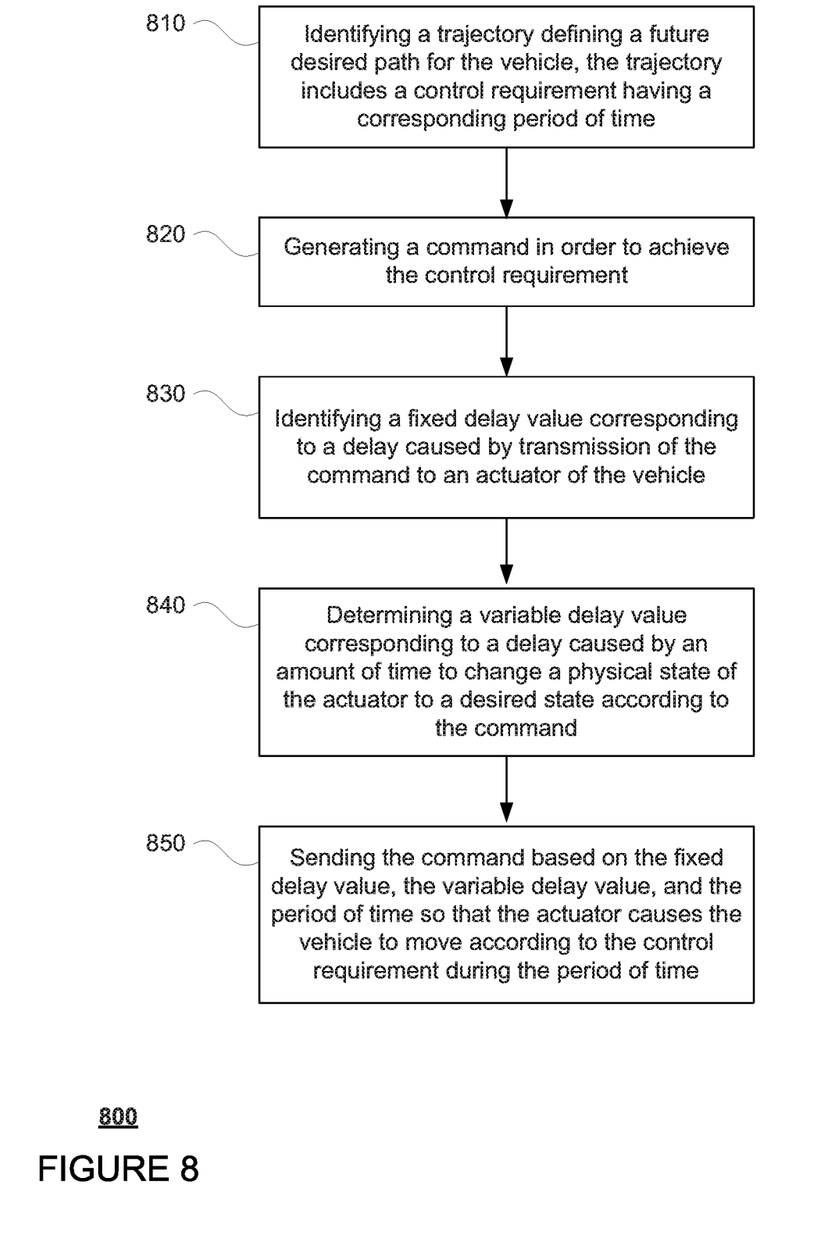
FIG. 8 is an example flow diagram in accordance with aspects of the disclosure.

FIG. 8 includes an example flow diagram 800 of some of the examples methods for controlling a vehicle in an autonomous driving mode as described above. In this example, the steps of flow diagram may be performed by one or more processors of one or more computing devices, such as processors 120 of computing devices 110. In this example, at block 810, a trajectory defining a future desired path for the vehicle including a control requirement having a corresponding point or period of time is identified. At block 820, a command is generated in order to achieve the control requirement. At block 830, a fixed delay value for the command corresponding to a delay caused by transmission of the command to an actuator of the vehicle is identified. At 840, a variable delay value for the command, the variable delay value corresponding to a delay caused by an amount of time to change a physical state of the actuator to a desired state according to the command is determined. At block 850, the command is sent based on the fixed delay value, the variable delay value, and the period of time so that the actuator causes the vehicle to move according to the control requirement during the period of time.

In addition to the aforementioned adjustments for fixed and variable delays in the vehicle, the computing devices may also adjust the timing, and in some cases the amount of deceleration, acceleration, or steering changes of the commands for expected environmental delays in the vehicle reaching desired acceleration or deceleration based on the vehicle's environment. For example, the computing devices 110 may have access to highly detailed maps of the vehicle's environment, including, for instance elevation maps identifying the changes in grade of road surfaces. The computing devices 110 may therefore use this information to determine whether the vehicle should begin accelerating sooner (i.e. because the vehicle will be going uphill shortly and will need additional acceleration to reach a desired acceleration or deceleration) or decelerating sooner (i.e. because the vehicle will be going downhill shortly and will need additional deceleration to reach a desired deceleration or acceleration). For instance, the computing devices 110 may have access to information, such as a table, database, or other storage configuration of memory 130, identifying how certain slopes will affect the acceleration or deceleration of the vehicle. This may even account for the current weight or passenger(s) or cargo in the vehicle.

As another example, the computing devices 110 may use expected or detected road surface conditions and temperature conditions to adjust the timing and/or amount of or example, deceleration, acceleration, or steering changes of the commands. This information may be provided to the computing devices 110 by the perception system 172 and/or server computing devices 410 periodically. Such conditions may include whether there is ice, snow, water, mud on the road surface or any other condition which would affect the timing of the vehicle's systems, for instance, the amount of throttle required to achieve a given acceleration may be higher or lower in such conditions requiring additional time to achieve the desired acceleration and could even affect the vehicle's ability to follow the trajectory. Temperatures may not only affect the condition of any precipitation of the road surface, but also how the vehicle's wheels (i.e. tires) respond to or interact with the road surface, how the vehicle's brake pad temperature will affect braking behavior (for instance, requiring more pressure to achieve certain stopping, which in turn, may require additional time, or delay, to build up to that additional pressure requirement), how engine temperature would change engine behavior (for instance, a cold or overheating engine may run slower than an engine operating somewhere in between, thus requiring additional time for the engine to respond to commands), etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle in an autonomous driving mode, the method comprising:
   identifying, by one or more processors, a trajectory defining a future desired path for the vehicle, the trajectory includes a speed requirement having a corresponding point in time;
   generating, by the one or more processors, a command in order to achieve the speed requirement;
   identifying, by the one or more processors, a fixed delay value corresponding to a delay caused by transmission of the command to an actuator of the vehicle;
   determining, by the one or more processors, a variable delay value corresponding to an amount of time required to change a speed of the vehicle by an amount specified by the speed requirement;
   summing, by the one or more processors, the fixed delay value and the variable delay value in order to identify a total estimated delay time; and
   sending, by the one or more processors, the command based on the total estimated delay time so that the actuator causes the vehicle to move according to the speed requirement at the point in time.

2. The method of claim 1, wherein the actuator is an actuator of an acceleration system of the vehicle.

3. The method of claim 2, wherein the speed requirement includes increasing acceleration of the vehicle to reach a desired speed.

4. The method of claim 3, wherein the variable delay value corresponds to an amount of time for an engine or motor of the vehicle to reach the desired speed.

5. The method of claim 1, wherein the actuator is an actuator of a deceleration system of the vehicle.

6. The method of claim 5, wherein the speed requirement includes increasing deceleration of the vehicle to reach a desired speed.

7. The method of claim 6, wherein the variable delay value corresponds to an amount of time for a brake of the vehicle to reach the desired deceleration level.

8. The method of claim 1, further comprising:
   determining an environmental delay value based on a grade of a road surface for an estimated location of the vehicle, and
   wherein sending the command is further based on the environmental delay value.

9. A system for controlling a vehicle in an autonomous driving mode, the system comprising one or more processors configured to:
   identify a trajectory defining a future desired path for the vehicle, the trajectory includes a speed requirement having a corresponding point in time;
   generate a command in order to achieve the speed requirement;
   identify a fixed delay value corresponding to a delay caused by transmission of the command to an actuator of the vehicle;
   determine a variable delay value corresponding to an amount of time required to change a speed of the vehicle by an amount specified by the speed requirement;
   sum the fixed delay value and the variable delay value in order to identify a total estimated delay time; and
   send the command based on the total estimated delay time so that the actuator causes the vehicle to move according to the speed requirement at the point in time.

10. The system of claim 9, wherein the actuator is an actuator of an acceleration system of the vehicle and the speed requirement includes increasing acceleration of the vehicle to reach a desired speed.

11. The system of claim 10, wherein the variable delay value corresponds to an amount of time for an engine or motor of the vehicle to reach a desired speed.

12. The system of claim 9, wherein the actuator is an actuator of a deceleration system of the vehicle and the speed requirement includes increasing deceleration of the vehicle to reach a desired speed.

13. The system of claim 12, wherein the variable delay value corresponds to an amount of time for a brake of the vehicle to reach the desired speed.

14. The system of claim 9, wherein the one or more processors are further configured to:
   determine an environmental delay value based on a grade of a road surface for an estimated location of the vehicle, and
   wherein sending the command is further based on the environmental delay value.

15. The system of claim 9, further comprising the vehicle.

16. A method of controlling a vehicle in an autonomous driving mode, the method comprising:
   identifying, by one or more processors, a trajectory defining a future desired path for the vehicle, the trajectory includes a tire orientation requirement having a corresponding point in time;
   generating, by the one or more processors, a command in order to achieve the tire orientation requirement;
   identifying, by the one or more processors, a fixed delay value corresponding to a delay caused by transmission of the command to an actuator of the vehicle;
   determining, by the one or more processors, a variable delay value corresponding to an amount of time required to change an orientation of a tire of the vehicle by an amount specified by the tire orientation requirement;
   summing, by the one or more processors, the fixed delay value and the variable delay value in order to identify a total estimated delay time; and
   sending, by the one or more processors, the command based on the total estimated delay time so that the actuator causes the vehicle to move according to the tire orientation requirement at the point in time.

17. The method of claim 16, wherein the actuator is an actuator of a steering system of the vehicle.

18. The method of claim 17, wherein the tire orientation requirement includes changing an orientation of the tire of the vehicle to a desired orientation.

19. The method of claim 18, wherein the variable delay value corresponds to an amount of time for the tire of the vehicle to reach the desired orientation.

20. A system for controlling a vehicle in an autonomous driving mode, the system comprising one or more processors configured to:
   identify a trajectory defining a future desired path for the vehicle, the trajectory includes a tire orientation requirement having a corresponding point in time;
   generate a command in order to achieve the tire orientation requirement;
   identify a fixed delay value corresponding to a delay caused by transmission of the command to an actuator of the vehicle;
   determine a variable delay value corresponding to an amount of time to change an orientation of a tire of the vehicle by an amount specified by the tire orientation requirement;
   sum the fixed delay value and the variable delay value in order to identify a total estimated delay time; and
   send the command based on the total estimated delay time so that the actuator causes the vehicle to move according to the tire orientation requirement at the point in time.

21. The system of claim 20, wherein the actuator is an actuator of a steering system of the vehicle and the tire orientation requirement includes changing an orientation of the tire of the vehicle to a desired orientation.

22. The system of claim 21, wherein the variable delay value corresponds to an amount of time for the tire of the vehicle to reach the desired orientation.

\* \* \* \* \*